(12) United States Patent
Maze et al.

(10) Patent No.: US 11,479,017 B2
(45) Date of Patent: Oct. 25, 2022

(54) HIGH STRENGTH NONWOVEN BARRIER MATERIAL

(71) Applicant: North Carolina State University, Raleigh, NC (US)

(72) Inventors: Benoit Maze, Raleigh, NC (US); Behnam Pourdeyhimi, Cary, NC (US)

(73) Assignee: North Carolina State University, Raleigh, NC (US)

( * ) Notice: Subject to any disclaimer, the term of this patent is extended or adjusted under 35 U.S.C. 154(b) by 84 days.

(21) Appl. No.: 16/778,726

(22) Filed: Jan. 31, 2020

(65) Prior Publication Data
US 2020/0164618 A1 May 28, 2020

Related U.S. Application Data

(63) Continuation of application No. PCT/IB2018/055797, filed on Aug. 1, 2018.
(Continued)

(51) Int. Cl.
*B32B 5/26* (2006.01)
*B32B 5/02* (2006.01)
(Continued)

(52) U.S. Cl.
CPC .............. *B32B 5/26* (2013.01); *B32B 5/022* (2013.01); *B32B 37/06* (2013.01); *D04H 3/147* (2013.01); *D04H 3/16* (2013.01); *B32B 2250/20* (2013.01); *B32B 2250/24* (2013.01); *B32B 2262/0253* (2013.01); *B32B 2262/0284* (2013.01); *B32B 2274/00* (2013.01); *B32B 2305/20* (2013.01); *B32B 2307/718* (2013.01);
(Continued)

(58) Field of Classification Search
CPC ........... B32B 5/26; B32B 5/022; B32B 37/06; B32B 2250/20; B32B 2250/24; B32B 2274/00; B32B 2305/20; B32B 2367/00; B32B 2323/04; B32B 2439/80; B32B 2262/0253; B32B 2307/718; B32B 2262/0284; D04H 3/16; D04H 3/147
See application file for complete search history.

(56) References Cited

U.S. PATENT DOCUMENTS 4,761,322 A * 8/1988 Raley ...................... B32B 5/26
428/198
4,863,785 A * 9/1989 Berman ................... D04H 3/14
428/218

(Continued)

*Primary Examiner* — Jeremy R Pierce
(74) *Attorney, Agent, or Firm* — Womble Bond Dickinson (US) LLP

(57) ABSTRACT

The present invention is directed toward a method of making a composite structure including receiving a substantially planar nonwoven spunbond layer including a plurality of multicomponent fibers, thermally bonding the nonwoven spunbond layer at a first bond temperature, laying down a meltblown layer on top of the thermally bonded nonwoven spunbond layer to form an intermediate structure, and thermally bonding the intermediate structure at a second bond temperature to form a final composite structure. Composite structures including a spunbond layer and a meltblown layer, wherein the composite structure has a tensile strength of at least about 130 N/2.54 cm in both machine and cross directions, a tear strength of at least 3.0 N/2.54 cm, and an LRV of about 2.0 or higher are also provided herein.

10 Claims, 7 Drawing Sheets

Related U.S. Application Data

(60) Provisional application No. 62/540,341, filed on Aug. 2, 2017.

(51) Int. Cl.
  *B32B 37/06* (2006.01)
  *D04H 3/147* (2012.01)
  *D04H 3/16* (2006.01)

(52) U.S. Cl.
  CPC ....... *B32B 2323/04* (2013.01); *B32B 2367/00* (2013.01); *B32B 2439/80* (2013.01)

(56) References Cited

U.S. PATENT DOCUMENTS

| | | |
|---|---|---|
| 6,096,668 A | 8/2000 | Abuto et al. |
| 2006/0223405 A1 | 10/2006 | Pourdeyhimi et al. |
| 2008/0287026 A1* | 11/2008 | Chakravarty ............. B32B 5/26 442/414 |
| 2009/0258559 A1 | 10/2009 | Anantharamaiah et al. |
| 2009/0264038 A1 | 10/2009 | Boscolo et al. |
| 2011/0250815 A1 | 10/2011 | Pourdeyhimi |
| 2014/0332476 A1 | 11/2014 | Pourdeyhimi |
| 2015/0290354 A1 | 10/2015 | Loboa et al. |
| 2017/0137970 A1 | 5/2017 | Pourdeyhimi et al. |
| 2018/0105965 A1 | 4/2018 | Pourdeyhimi et al. |
| 2018/0228659 A1* | 8/2018 | Conrad ................... D04H 3/16 |

* cited by examiner

HIGH STRENGTH NONWOVEN BARRIER MATERIAL

CROSS-REFERENCE TO RELATED APPLICATIONS

This application is a continuation of International Application No. PCT/IB2018/055797, filed Aug. 1, 2018, which claims priority from U.S. Provisional Application No. 62/540,341, filed Aug. 2, 2017, which applications are hereby incorporated in their entirety by reference in this application.

TECHNICAL FIELD

The subject matter disclosed herein relates generally to nonwoven fabrics used in applications wherein both good strength properties, such as high tensile and high tear strength properties, and microbial barrier properties are important.

BACKGROUND

Nonwoven fabrics or webs have a structure of individual fibers or threads which are interlaid, but not in a regular or identifiable manner as in a woven fabric. Nonwoven fabrics or webs have been formed from many processes which include carding, meltblowing, spunbonding and air or wet laying processes.

Melt blowing technology is a melt-spun process that can be used to produce microfibers by injecting a molten polymer stream into high velocity gas jets. Conventional meltblown structures are made from low molecular weight, low viscosity polymers to form highly drawn micro and nanofiber webs. For example, a large number of conventional meltblown structures are made from polypropylene since they are readily available in low viscosities which are required to form fine fibers. Although it is possible to form meltblown structures from polybutylene terephthalate (PBT), polyethylene terephthalate (PET), Nylons and other polymers, the higher viscosities of these polymers often leads to larger fibers, which can be undesirable in meltblown fabrics as meltblown structures are commonly used in filtration and barrier applications ranging from HVAC filters to facemasks and respirators to medical packaging and microbial barriers to liquid filtration. Conventional meltblown fibers and the fabrics formed therefrom are weak and have limited extensibility. Therefore, conventional meltblown structures can lack the desired strength for certain applications.

Nonwoven spunbonded fabrics are used in many products ranging from medical to hygiene to wipes, filters, automotive and geosynthetics produced or used in North America and Europe. Almost all such applications require a lightweight and often disposable fabric. Therefore, most spunbonded disposable fabrics are designed for single use generally requiring minimum bond strength to improve their softness and are designed to have adequate properties for the applications for which they are intended. Spunbonding refers to a process where the fibers, filaments, are extruded, cooled, and drawn and subsequently collected on a moving belt to form a fabric. The web thus collected is not bonded and the filaments must be bonded together thermally, mechanically or chemically to form a fabric. Thermal bonding is one of the most efficient and widely used bonding technologies in the nonwovens industry. It is used extensively in spunbond, meltblown, air-lay, and wet-lay manufacturing as well as with carded-web formation technologies.

Medical packaging is one area where nonwoven materials are increasingly used, particularly where the contents of the packaging must remain adequately sterilized. Certain nonwoven materials can exhibit good microbial barrier properties. However, finding a nonwoven material that possesses both high microbial barrier properties and sufficient strength can be a challenge. There is an ongoing need in the art for nonwoven materials suitable for use as a microbial barrier material, and which further exhibits high tensile and tear strength characteristics.

Barrier properties in a nonwoven such as a medical product can be achieved by using a composite of spunbond and meltblown often referred to as SMS where two layers of spunbond protect both sides of the meltblown barrier layer, and thereby provide sufficient strength for the final composite. These composite SMS structures can be made continuously. Using conventional processes, the SMS composite is bonded once at the end of the process line.

SUMMARY

A method of making a composite structure is provided herein, the method comprising: receiving a substantially planar nonwoven spunbond layer comprising a plurality of multicomponent fibers; thermally bonding the nonwoven spunbond layer at a first bond temperature; laying down a meltblown layer on top of the thermally bonded nonwoven spunbond layer to form an intermediate structure; and thermally bonding the intermediate structure at a second bond temperature to form a final composite structure. In some embodiments, the method can further comprise receiving a second substantially planar nonwoven spunbond layer comprising a plurality of multicomponent fibers; thermally bonding the second nonwoven spunbond layer at the first bond temperature; and laying down the second nonwoven spunbond layer on top of the meltblown layer prior to thermally bonding the intermediate structure.

In some embodiment of the methods described herein, the multicomponent fibers are bicomponent fibers comprising an external fiber component and an internal fiber component; wherein said external fiber component enwraps said internal fiber component; said external fiber component having a lower melting temperature than said internal fiber component. In various embodiments, the external fiber component can be polyethylene or polypropylene. In certain embodiments, the internal fiber component can comprise a polymer selected from the group consisting of polyesters and polyamides. In some embodiments, the internal fiber component can comprise a polymer selected from the group consisting of polyesters such as polybutylene terephthalate (PBT), polyethylene terephthalate (PET), polylactic acid (PLA); nylons such as nylon 6, nylon 6/6, nylon 11, nylon 12, nylon 6/11; and elastomers such as thermoplastic polyurethanes (TPUs) and thermoplastic elastomers (TPEs). In various embodiments of the present invention, the meltblown layer can comprise a plurality of fibers comprising polyethylene or polypropylene.

In various embodiments of the present invention, the first bond temperature can be about 140° C. to about 160° C., or about 140° C. to about 150° C. In some embodiments, the first bond temperature is at least about 140° C., or at least about 150° C. For example, in certain preferred embodiments, the first bond temperature can be about 140° C. In some embodiments, the second bond temperature can be about 90° C. to about 130° C., or about 100° C. to about 130° C., or about 110° C. to about 120° C. In some embodiments, the second bond temperature is less than about 140° C., or less than about 130° C. For example, in certain preferred embodiments, the second bond temperature can be about 110° C.

In certain embodiments of the present invention, the composite structure can have a log reduction value (LRV) of about 2.0 or higher, or about 2.5 or higher, or about 3.0 or higher, where LRV is determined according to ASTM F1608 (Standard Test Method for Microbial Ranking of Porous Packaging Materials (Exposure Chamber Method)), such as an LRV of about 2.0 to about 4.0 or about 2.0 to about 3.0.

A composite structure is also provided herein. In various embodiments, the composite structure can comprise a substantially planar nonwoven spunbond layer comprising a plurality of multicomponent fibers; and a meltblown layer on top of the nonwoven spunbond layer; wherein the composite structure exhibits one or more of the following characteristics: a tensile strength of at least about 130 N/2.54 cm in both machine and cross directions determined according to ASTM D5035 or EN ISO 1924-2 standard test methods; a tear strength of at least 3.0 N/2.54 cm determined according to ASTM D1424 or EN 21974 test methods; an LRV of about 2.0 or higher; and a basis weight of about 100 g/m$^2$ or less.

The invention includes, without limitation, the following embodiments.

Embodiment 1 a method of making a composite structure comprising receiving a substantially planar nonwoven spunbond layer comprising a plurality of multicomponent fibers; thermally bonding the nonwoven spunbond layer at a first bond temperature; laying down a meltblown layer on top of the thermally bonded nonwoven spunbond layer to form an intermediate structure; and thermally bonding the intermediate structure at a second bond temperature to form a final composite structure.

Embodiment 2

A method of any preceding embodiment, further comprising receiving a second substantially planar nonwoven spunbond layer comprising a plurality of multicomponent fibers; thermally bonding the second nonwoven spunbond layer at the first bond temperature; and laying down the second nonwoven spunbond layer on top of the meltblown layer prior to thermally bonding the intermediate structure.

Embodiment 3

A method of any preceding embodiment, wherein the multicomponent fibers are bicomponent fibers comprising an external fiber component and an internal fiber component; wherein said external fiber component enwraps said internal fiber component; said external fiber component having a lower melting temperature than said internal fiber component.

Embodiment 4

A method of any preceding embodiment, wherein the external fiber component is polyethylene or polypropylene.

Embodiment 5

A method of any preceding embodiment, wherein the internal fiber component comprises a polymer selected from the group consisting of polyesters and polyamides.

Embodiment 6

A method of any preceding embodiment, wherein the internal fiber component comprises a polymer selected from the group consisting of polybutylene terephthalate (PBT), polyethylene terephthalate (PET), polylactic acid (PLA), nylon 6, nylon 6/6, nylon 11, nylon 12, nylon 6/11, thermoplastic polyurethanes (TPUs) and thermoplastic elastomers (TPEs).

Embodiment 7

A method of any preceding embodiment, wherein the first bond temperature is about 140° C. to about 160° C.

Embodiment 8

A method of any preceding embodiment, wherein the second bond temperature is about 90° C. to about 130° C.

Embodiment 9

A method of any preceding embodiment, wherein the composite structure has an LRV value of about 2.0 or higher.

Embodiment 10

A method of any preceding embodiment, wherein the meltblown layer comprises a plurality of fibers comprising polyethylene or polypropylene.

Embodiment 11

A composite structure comprising: a substantially planar nonwoven spunbond layer comprising a plurality of multicomponent fibers; and a meltblown layer on top of the nonwoven spunbond layer; wherein the composite structure has a tensile strength of at least about 130 N/2.54 cm (or at least about 150 N/2.54 cm) in both machine and cross directions; wherein the composite structure has a tear strength of at least 3.0 N/2.54 cm; wherein the composite structure has an LRV of about 2.0 or higher; and wherein the composite structure has a basis weight of less than 100 g/m$^2$.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

Figure 1:
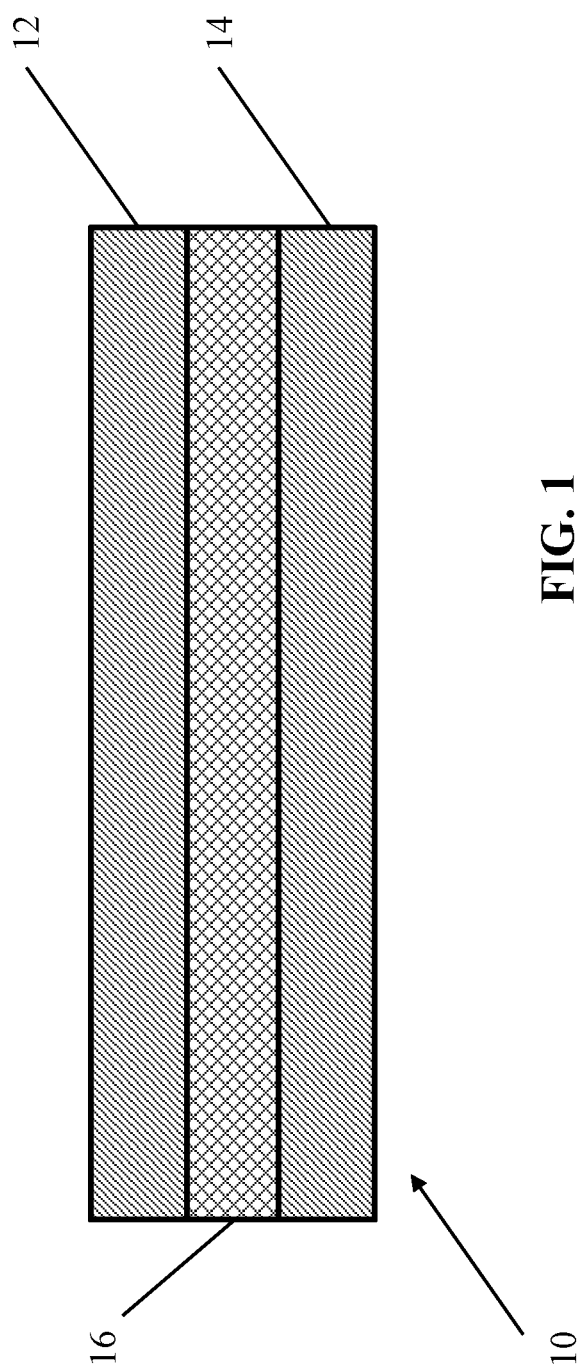
FIG. 1 is a cross-sectional view of an embodiment of a composite structure of the present invention.

The present invention provides a composite structure comprising a lightweight high-tensile, high-tear strength bicomponent spunbond nonwoven fabric combined with a meltblown layer. The present invention further provides methods of making the composite structures described herein. In various embodiments of the present invention, the composite structure can comprise at least one meltblown layer positioned adjacent to a spunbond layer. In certain embodiments, the composite structure can comprise at least one meltblown layer positioned between two or more spunbond layers, such that at least one spunbond layer is positioned both above and below, with respect to a substantially horizontal plane, of the meltblown layer. See, for example, the composite structure 10 illustrated in FIG. 1, wherein a meltblown layer 16 is sandwiched between a first spunbond layer 12 and a second spunbond layer 14.

Composite structures as described herein can have various uses. Without being limited by theory, a melt blowing technology can produce meltblown fabrics having relatively small pore sizes. Such meltblown fabrics can be useful as filtration products and barrier layers, for example. However, meltblown fabrics can often lack high tensile and/or high tear strength that can be desirable for certain applications. As such, a composite structure comprising at least one meltblown fabric and at least one spunbond fabric can provide certain benefits associated with meltblown fabrics while still demonstrating increased strength characteristics.

Spunbond/meltblown composite structures and methods of making the same are known in the art, however, several drawbacks are associated with conventional structures and methods of making the same. In particular, as discussed in more detail below, high temperature calendaring processes that can be used to strengthen spunbond fabrics can destroy the more fragile meltblown layer. However, low temperature calendaring processes do not produce spunbond fabrics having the same strength as those produced using high temperature calendaring processes. The present invention provides improved processes, as compared to conventional continuous processes for making spunbond/meltblown composite structures. Furthermore, the spunbond/meltblown composite structures produced according to methods described herein exhibit improved strength and other characteristics over conventional spunbond/meltblown composite structures.

Figure 2:
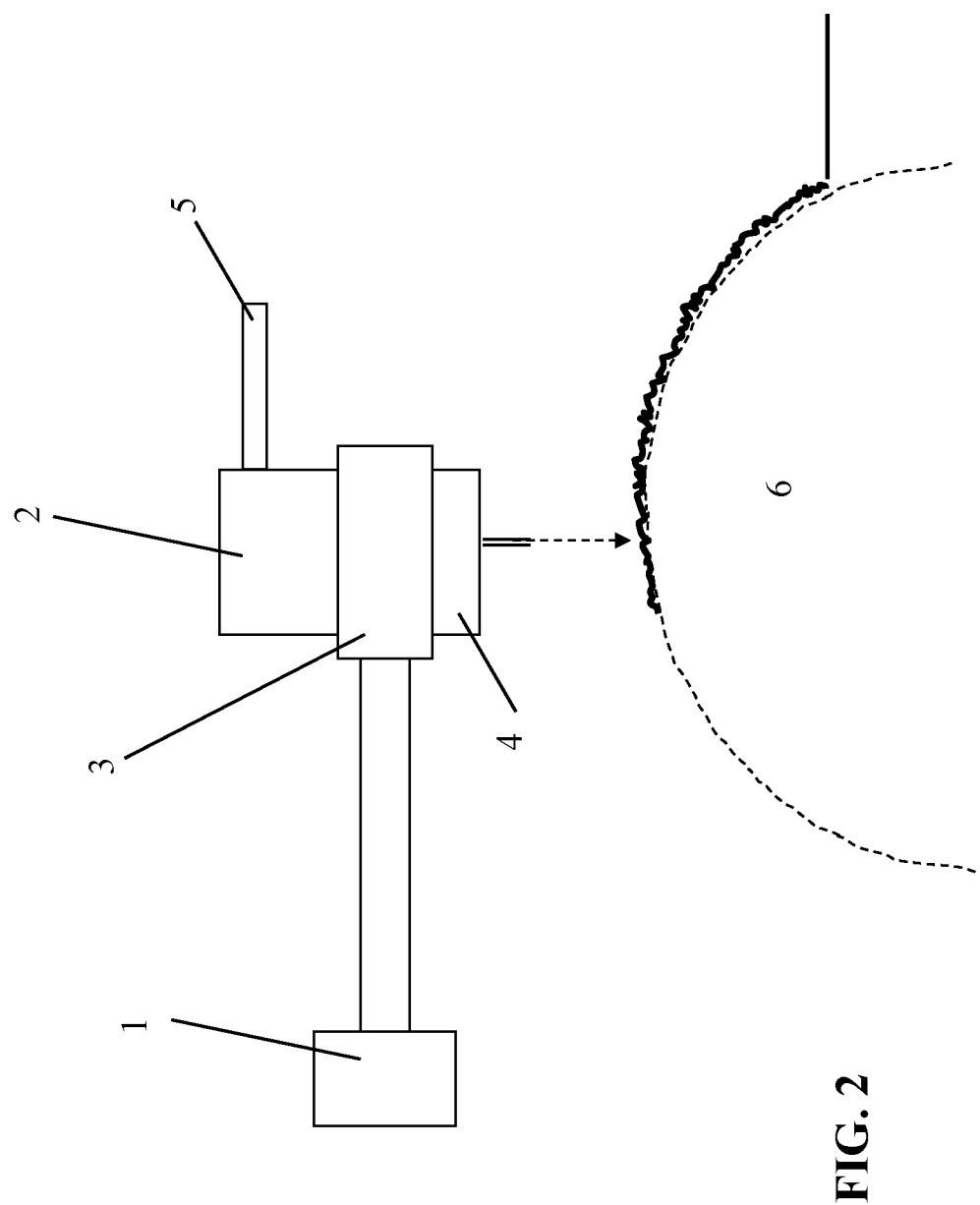
FIG. 2 is a schematic drawing of a typical meltblowing process.

Various embodiments of the composite structures described herein comprise at least one meltblown layer. Without being limited by theory, a meltblown fabric can provide bacterial barrier properties for medical packaging, for example. Melt blowing technology is a melt-spun process that can be used to produce microfibers by injecting a molten polymer stream into high velocity gas jets. As illustrated in FIG. 2, for example, a high-velocity gas jet impinges upon the polymer as it emerges from the spinneret 4. An extruder 1 can feed a polymer to a first die 3 and through spinneret 4. Air can come in the air intake 5 and into the air manifold 2. High pressure air is then used to draw the polymer into a fiber which can be collected on collector 6. The drag force caused by the air attenuates the fiber rapidly, and reduces its diameter as much as a hundred times from the nozzle diameter. Melt blown webs are typically reported to have fibers in the range of 0.1-10 μm, high surface area per unit weight, high insulation value, self-bonding, and high barrier properties yet breathability.

The fiber formation process in melt blowing can be critically dependent on the aerodynamics of the process. For example, the drag force due to the high-speed air is the main cause of fiber attenuation. Primary air systems include high-speed air jets that impinge upon the molten polymer streams once they exit the die. Secondary cross flow air streams can be employed to provide cold or ambient air to quench the extruded filaments. See, e.g., U.S. Pat. No. 5,080,569 to Gubernick et al., which is incorporated by reference herein. See also the secondary air quenching system for a spun-bonding die system disclosed in U.S. Pat. No. 5,098,636 to Balk, herein incorporated by reference. Accelerating the air below the die face by recessing the die tip above the die face in order to increase the air velocity can thereby increase the drag force and fiber attenuation. See, e.g., U.S. Pat. Pub. No. 2003/0173701 to Arseneau et al. It has been shown that for such inset dies, the maximum turbulence intensity occurs right at the die face, where the constriction is at its smallest and where a molten polymer fiber might start to vibrate and stick to the die tip. The use of a cold secondary air stream followed by an air constrictor can be used to increase the fiber attenuation after fibers solidified. See, e.g., WO 2006/037371, which is herein incorporated by reference. However, such rapid cooling of the fibers near the die face can result in a larger fiber diameter, and the cross flow direction can make the fibers sticks or accumulate on the edges of the air constrictors.

Meltblowing is generally capable of providing fibers with relatively small diameters. Diameter and other properties of meltblown fibers can be tailored by modifying various process parameters (e.g., die design, die capillary size, polymer throughput, air characteristics, collector placement, and web handling). Attenuating the air pressure affects fiber size, as higher pressures typically yield finer fibers (e.g., up to about 5 microns, such as about 1-5 microns) and lower pressures yield coarser fibers (e.g., up to about 30 microns, such as about 10-30 microns). In certain embodiments of the present invention, the nonwoven web comprises meltblown fibers having average diameters in the range of about 1 to about 10, e.g., about 2 to about 5 microns. In some embodiments, the mean flow pore size of a meltblown nonwoven web can be about 20 microns or less, about 10 microns or less, about 8 microns or less, about 5 microns or less, about 2 microns or less, or about 1 micron or less. The meltblown fibers typically comprise single component fibers.

A conventional Exxon-design meltblown technology (i.e., single-row-capillary or impinging-air type die design) has a single row of spinning capillaries with impinging air streams from both sides of the die tip to draw the fibers. The safe operation pressure of this process is less than about 100 bar, for example. The Biax meltblown die technology (i.e., concentric-air design) features multiple rows of spinning nozzles with individual concentric air jets to attenuate the fibers. It also tolerates high melt pressures at the spinneret and therefore can utilize higher viscosity polymers with a wide operation window. See, e.g., R. Zhao, "Melt Blowing Polyoxymethylene Copolymer," *International Nonwoven Journal*, Summer 2005, pp. 19-21 (2005), herein incorporated by reference. As such, the different die types can return different sized fibers and utilize different polymers.

Currently available polymers of interest have melt flow rates mostly lower than 100 compared to common meltblown grade polypropylene resins that have melt flow rates higher than 100 and as much as 2400, for example. In other words, one can expect high melt pressure during melt blowing of these polymers. A concentric-air design die type can be used with polymers with lower melt flow rates. For example, a concentric-air design die type can be used to draw polymers with a melt flow of about 1600 to about 30 melt flow or less. A concentric-air design die type can comprise capillaries each having a diameter that ranges from about 100 to about 800 microns. In certain preferred embodiments, viscosity of the meltblown polymer is at least about 100 melt flow or greater.

In various embodiments of the present invention, at least one thermoplastic polymer and/or a blend thereof can be used to fabricate the meltblown nonwoven fabrics described herein. Fibers used in forming meltblown nonwoven webs can include, for example, one or more thermoplastic polymers selected from the group consisting of: polyesters, co-polyesters, polylactic acid, polyamides, polyolefins, polyacrylates, thermoplastic liquid crystalline polymers, elastomers such as PBax, Elastollan, Kraton and Hytrel, and combinations thereof. In some embodiments a single layer meltblown structure can be fabricated from fibers comprising polyester, co-polyester, polypropylene, polyethylene, or polyamide type polymeric materials, or combinations thereof. Other fiber grade polymers can also be used to form the nonwoven webs described herein. In certain preferred embodiments, the composite structure comprises a meltblown layer comprising polyethylene or polypropylene (or other polyolefin).

In various embodiments of the present invention, a composite structure is provided, wherein the composite structure comprises a nonwoven fabric which is manufactured utilizing a bicomponent fiber structure. See, e.g., the nonwoven fabrics and manufacturing methods described in U.S. Pat. No. 7,438,777 to Pourdeyhimi et al. (hereinafter the '777 patent), which is herein incorporated by reference in its entirety. It was surprisingly discovered that spunbond/meltblown composite structures having a multicomponent fiber used in at least one spunbond layer exhibit increased strength characteristics for the overall composite structure. It is noted that the present invention contemplates multicomponent fibers having two or more components. For simplicity purposes, the description below and the Examples refer to bicomponent fibers, however, this is not intended to be limiting.

As described in the '777 patent, the bicomponent fiber structure consists of two distinct fiber compositions which are produced preferably utilizing spun-bound technology with an external fiber component enwrapping a second internal fiber component. The fibers according to the present invention can vary, and include fibers having any type of cross-section, including, but not limited to, circular, rectangular, square, oval, triangular, and multilobal. In certain embodiments, the fibers can have one or more void spaces, wherein the void spaces can have, for example, circular, rectangular, square, oval, triangular, or multilobal cross-sections. The fibers may be selected from single-component (i.e., uniform in composition throughout the fiber) or multicomponent fiber types including, but not limited to, fibers having a sheath/core structure and fibers having an islands-in-the-sea structure, as well as fibers having a side-by-side, segmented pie, segmented cross, segmented ribbon, or tipped multilobal cross-sections.

Figure 3A:
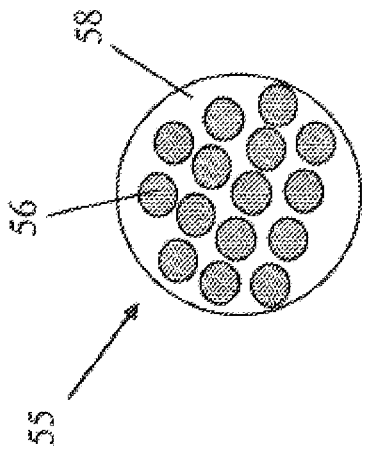
FIGS. 3A-3D provide cross-sectional view of exemplary bicomponent fibers that can be used to practice the invention.
Figure 3B:
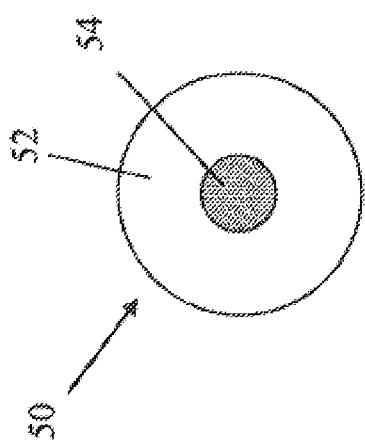
Figure 3C:
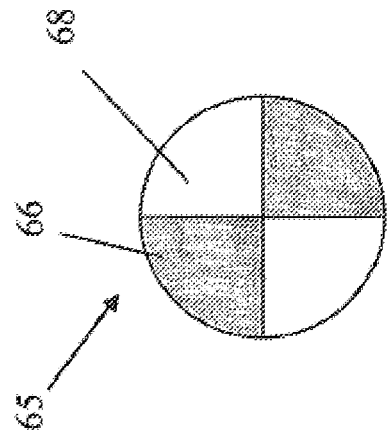
Figure 3D:
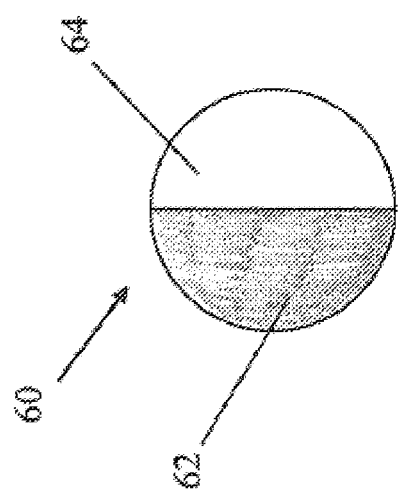

For example, FIG. 3A illustrates a cross-sectional view of an exemplary multicomponent fiber of the present invention, designated generally as 50. Multicomponent fiber 50 is a sheath/core fiber that includes at least two structured components: (i) an outer sheath component 52; and (ii) an inner core component 54. FIG. 3B, for example, illustrates another advantageous embodiment of the invention in which the multicomponent fiber 55 of the invention is a "matrix" or "islands in a sea" type fiber having a plurality of inner, or "island," components 56 surrounded by an outer matrix, or "sea," component 58. The island components can be substantially uniformly arranged within the matrix of the sea component, or the island components can be randomly distributed within the sea matrix. FIG. 3C illustrates a side-by-side multicomponent fiber 60 wherein the first component 62 and the second component 64 are arranged in a side-by-side relationship. FIG. 3D illustrates an embodiment of the invention wherein the multicomponent fiber 65 is configured in a pie-wedge arrangement, wherein the first component 66 and the second component 68 are arranged as alternating wedges. Although not illustrated, other multicomponent arrangements known in the art are also contemplated in the present invention.

In various embodiments of the present invention, the method of the invention includes the step of forming a single or more layers of spunbonded filaments wherein the fibers or filaments are bicomponent with two polymers. As described in the '777 patent, it was discovered that in a bicomponent fiber in the form of sheath-core or islands-in-sea, the fiber-bond interface properties can be enhanced when the external and internal fiber components are sufficiently different in their melt properties and the external fiber is completely melted at a bond point. Additionally, the bicomponent fibers must have certain differing characteristics. The sheath or sea component must have a melting temperature which is lower than the core or island component. This difference should be at least fifteen degrees Celsius and is preferably twenty degrees Celsius or more. At the bond point, the external fiber of at least two adjoining fibers are completely melted forming a matrix which encapsulates the internal fiber. When the bicomponent fibers utilized are of the islands-in-sea configuration, the entire sea is melted and most preferably, the entire sea of two adjoining fibers is completely melted. Hence, for bicomponent fibers utilizing islands-in-sea, it is feasible to melt the sea component even in locations which are not bonded with adjacent fibers.

Additionally, to improve spinnability of said bicomponent fibers, it is preferred that the thermoplastic materials also have different viscosity values. Also, the viscosity of the sheath or sea component must be equal or greater than the core or island component. Preferably the external fiber has a viscosity of about one and a half times than that of the internal fiber. Best results have been obtained when the external fiber has a viscosity of twice the internal fiber. Such differential in viscosities enables the matrix to be formed in a manner conducive to forming the high strength fiber of the invention.

Also, the two components forming the internal and external portions of the fibers preferably have different elongation to break values. A suitable measurement of elongation to break values may be obtained utilizing ASTM standard D5034-95. The internal fiber preferably has an elongation to break value less than the external fiber. Preferably, the internal fiber has an elongation to break value at least thirty percent less than the external fiber. For instance the external fiber may have an elongation to break value of fifty percent and the internal fiber has an elongation to break value of thirty percent. This difference facilitates in the shear and tensile forces applied to the nonwoven fabric to be transferred to the internal (stronger) fiber through the matrix (weaker) thereby enhancing the bond strength of the fibers. While the invention can be maintained by forming a matrix, with additional strength being obtained with either the viscosity of the fibers being different or the elongation to break of the fibers being different, best results have been obtained by forming a matrix with an internal fiber being more viscous than the external fiber and the internal fiber having a lower elongation to break value.

Figure 4:
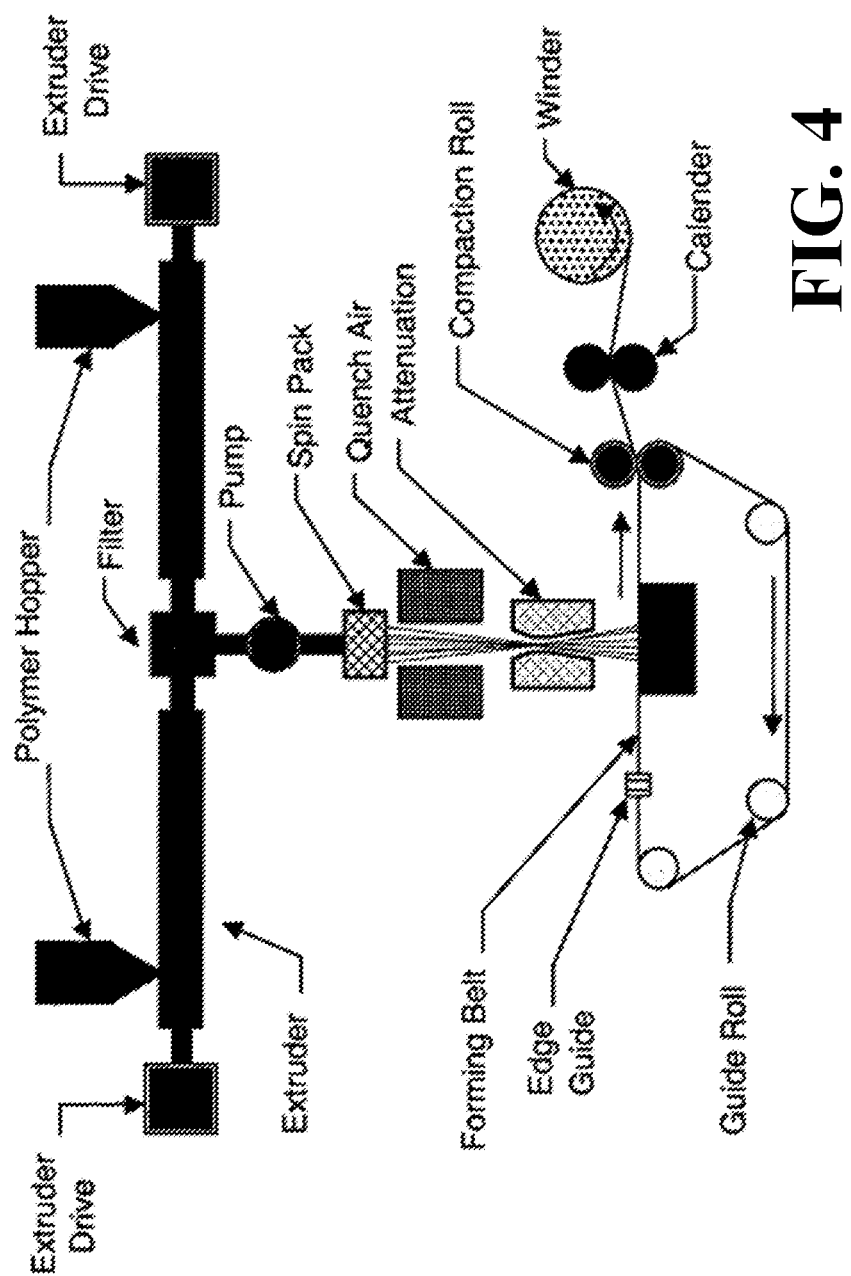
FIG. 4 is schematic drawing of typical bicomponent spunbonding process.

FIG. 4 illustrates the typical spunbond process. In a spunbonded process, small diameter fibers are formed by extruding molten thermoplastic material as filaments from a plurality of fine capillaries of a spinneret having a circular or other configuration, with the diameter of the extruded filaments then being rapidly reduced. As shown in FIG. 4, a first component thermoplastic is positioned in a first polymer hopper and a second component thermoplastic is positioned in a second polymer hopper. The components are then pumped through a spin pack and joined together to form a conjugate fiber. This conjugate fiber is quenched and attenuated and positioned onto a forming belt. The fiber is then bonded.

In a preferred embodiment of the spunbond layer of the composite material, the external fiber component thermoplastic is utilized to form an external sheath or sea for the fiber and the internal fiber component thermoplastic is utilized to form the internal core or islands. Examples of polymer components desired to be utilized for the sea are polyethylenes, linear low density polyethylenes in which the alpha-olefin comonomer content is more than about 10% by weight, copolymers of ethylene with at least one vinyl monomer, copolymers of ethylene with unsaturated aliphatic carboxylic acids.

Additionally, for the sea component and/or island component other preferred thermoplastics include those wherein the polymers are selected from the group of thermoplastic polymers wherein said thermoplastic polymer is selected from polypropylene or polyethylene. Additionally, other suitable thermoplastics include those wherein the thermoplastic polymer is selected from the group consisting of: polyesters (e.g., polybutylene terephthalate (PBT) or polyethylene terephthalate (PET)), polyamides (e.g., nylon 6, nylon 6/6, nylon 6,6/6, nylon 6/10, nylon 6/11, nylon 6/12), thermoplastic copolyetherester elastomers, polyolefins, polyacrylates, and thermoplastic liquid crystalline polymers. Preferably, the thermoplastics include those wherein the polymers are selected from the group of thermoplastic polymers comprising a copolyetherester elastomer with long chain ether ester units and short chain ester units joined head to tail through ester linkages. More preferably, the polymers for the core, the islands, the sheath or the sea are selected from the group of thermoplastic polymers fabricated in a temperature range of 50° C. to 450° C.

In certain preferred embodiments of the composite structures described herein, the meltblown layer is fabricated from the same polymer or polymer blend used as the sheath component as the fibers used to form at least one spunbond layer. For example, the composite structure can comprise a meltblown layer comprising polyethylene or polypropylene (or another polyolefin) and a spunbond layer, wherein the sheath component of the bicomponent fibers used to form the spunbond layer also comprises polyethylene or polypropylene (or other polyolefin).

The shape of the core or islands filaments may be circular or multi-lobal. Furthermore, when the bicomponent fiber is of an islands in sea configuration, the islands may consist of fibers of different materials. For instance, certain polymers may be incorporated to contribute to wettability of the nonwoven web. These thermoplastics may include without limitation polyamids, polyvinyl acetates, saponified polyvinyl acetates, saponified ethylene vinyl acetates, and other hydrophilic materials. Polymers are generally considered to contribute to a nonwoven fabrics wettability if a droplet of water is positioned on a nonwoven web made from the conjugate filaments containing the respective polymeric components and has a contact angle which is a) less than 90 degrees measured using ASTM D724-89, and b) less than the contact angle of a similar nonwoven web made from similar filaments not containing the wettable thermoplastic.

Additionally, polymers may be included which contribute elastic properties to the thermoplastic nonwoven web. Such polymers include without limitation styrene-butadiene copolymers; elastomeric (single-site, e.g. metallocene-catalyzed) polypropylene, polyethylene, and other metallocene-catalyzed alpha-olefin homopolymers and copolymers having densities less than about 0.89 grams/cc; other amorphous poly alpha-olefins having density less than about 0.89 grams/cc; ethylene vinyl acetate, copolymers; ethylene propylene rubbers; and propylene-butene-1 copolymers and terpolymers.

Once the multicomponent fiber has been spunbond, it is placed onto a belt to create substantially continuous filaments of fibers. A substantially continuous filament of fibers refers to filaments or fibers prepared by extrusion from a spinneret, which are not cut from their original length prior to being formed into a nonwoven web or fabric. Substantially continuous filaments or fibers may have average lengths ranging from greater than about 15 cvm to more than one meter, and up to the length of the nonwoven web or fabric being formed. The definition of "substantially continuous filaments or fibers" includes those which are not cut prior to being formed into a nonwoven web or fabric, but which are later cut when the nonwoven web or fabric is cut. The substantially continuous filament of fibers form a nonwoven web on the belt and are bonded to create a nonwoven fabric.

Figure 5:
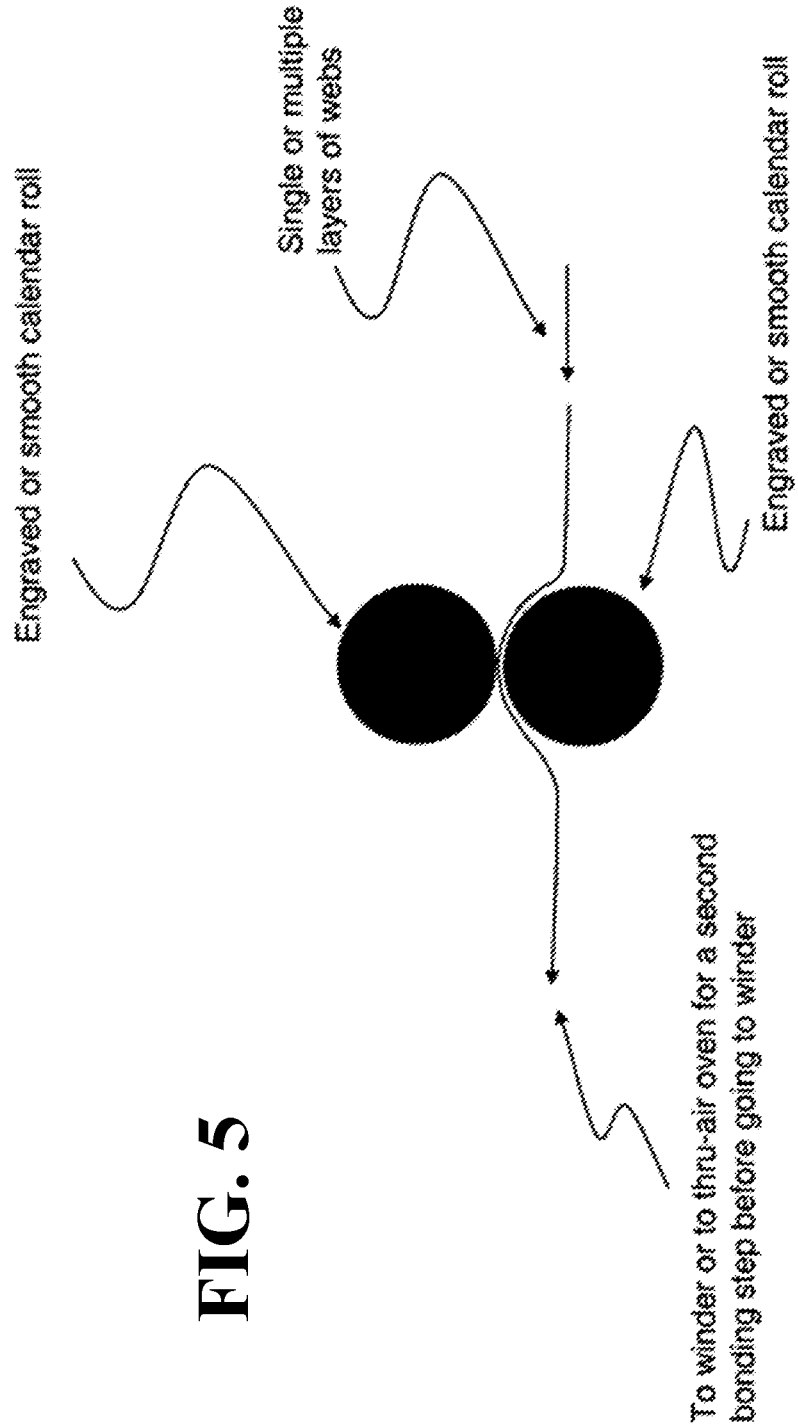
FIG. 5 is schematic drawing of typical calendar bonding process.
Figure 6:
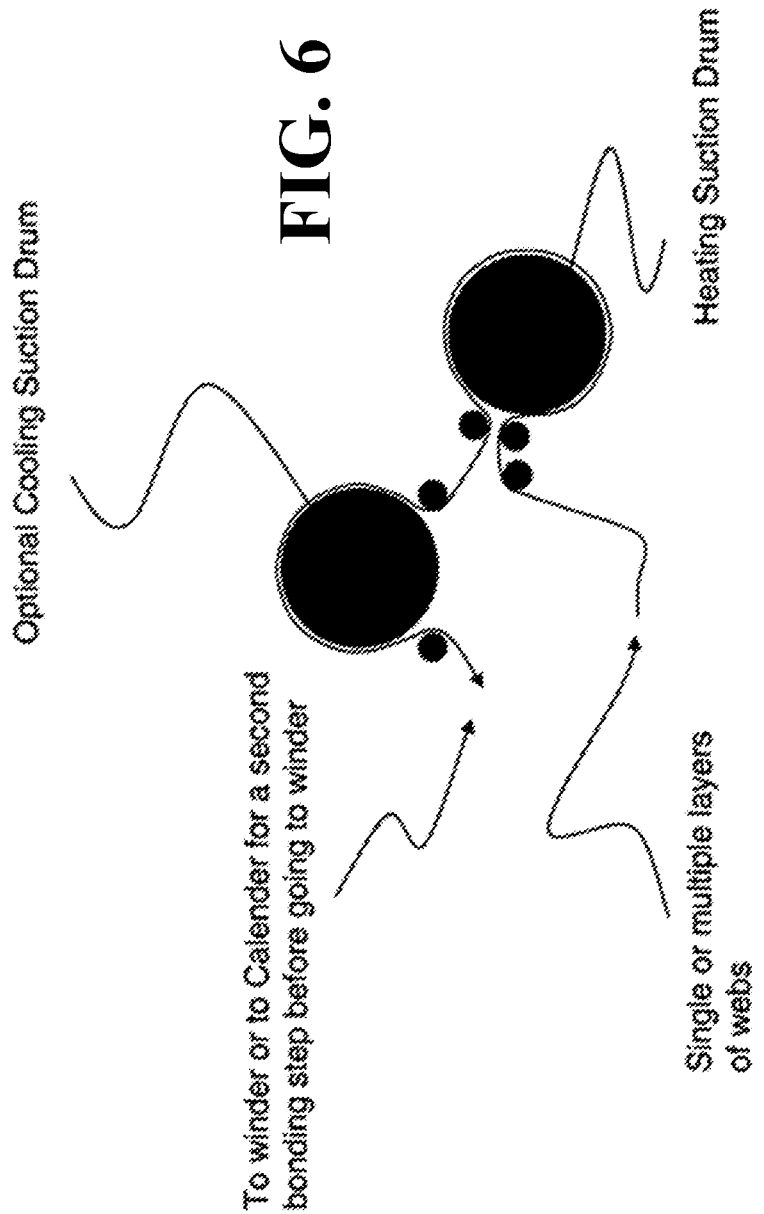
FIG. 6 is schematic drawing of typical single drum thru-air bonding oven.

Depending on the ultimate utilization of the nonwoven fabric, the substantially continuous fibers may be subjected to varying processes. If the highest strength nonwoven fabric is desired, the fibers will be subjected to thermal bonding via a smooth calendar. Alternately, the fabric may be subject to thermal bonding via point bonding. If a more flexible nonwoven fabric of high strength is desired, the fibers may be subjected to thermal bonding via thru air. For the thermal bonding process, the temperature of the fabric does not exceed the melting point of the sea or sheath by more than the difference than the melting point of the islands or core. For instance, in the preferred embodiment, the external component has a melting temperature which is twenty to a hundred and fifty degrees Celsius lower than the melting temperature of the internal fiber. Consequently, the fabric surface temperature would not exceed the melting point of the external fiber by more than twenty degrees in the first instance or a hundred and fifty degrees in the second instance. FIG. 5 is a schematic of a typical calendar bonding process. FIG. 6 illustrates a typical single drum thru-air bonding oven.

Figure 7:
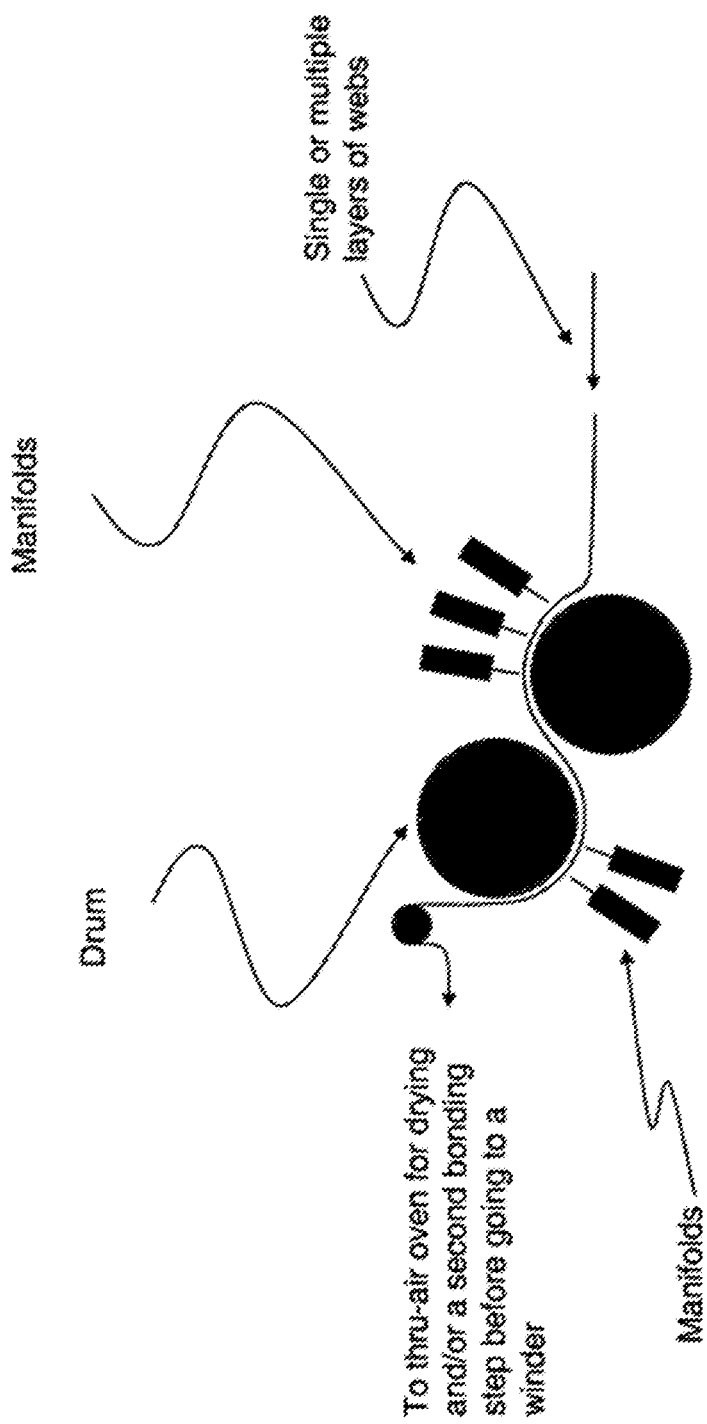
FIG. 7 is a schematic drawing of a typical drum entangling process.

If even a more flexible fabric of high strength is desired for a component of the composite structures described herein, the fibers may first be subjected to hydroentangling prior to being thermally bonded either via thru hot air or a smooth calendar. However, the inventors have discovered that in fabrics that are about 5 ounces per square yard or heavier, hydroentangled webs can lose their properties because of de-lamination at hydroentangling pressures of up to 250 bars. Therefore, for larger structures, a combined process where the structure needle punched, is hydroentangled and is subsequently thermally bonded, may be preferable. In one configuration the nonwoven fabric is exposed to the hydroentanglement process. In another, only one surface of the fabric is exposed to the hydroentanglement process. For the hydroentanglement process, the water pressure of corresponding manifolds preferably is between ten bars and one thousand bars. FIG. 7 illustrates a typical drum entangling process.

Additionally, the surface of the nonwoven fabric may be coated with a resin to form an impermeable material. Also, the resultant fabric may be post-processed after bonding with a dye process.

As disclosed in the '777 patent, a bonding process is provided which enables a multicomponent nonwoven fabric to exhibit strength at least four times greater than similarly bonded monofilament fabrics. The thermal bonding mechanism is one where the lower melting point sea or sheath melts and protects the islands or the core. Consequently, there is little or no damage to the islands and the sea acts as a binder or a matrix holding the structure together transferring the stress to the stronger core fibers. As disclosed in the '777 patent, the fibrous structures of the islands are preserved. This will be expected to result in higher tensile properties. Similarly, when the tear propagates through the fabric, the islands will be released, bunch together and help absorb energy resulting in high tear properties. Tests have shown that the invention results in a calendered nonwoven spunbond fabric having a tongue tear strength four times greater in the machine direction and twice as great in the cross direction than a similarly bonded homogeneous nylon fiber and a grab tensile strength one and a half times greater in the machine direction and almost four times as great in the cross direction.

As described above, high temperature calendar bonding used to strengthen the spunbond layers of the composite structures described herein can destroy the meltblown layer. It was surprisingly discovered that calendar bonding the at least one spunbond layer at a high temperature (e.g., about 140° C. to about 150° C.) and then calendar bonding the at least one spunbond layer and the at least one meltblown layer at a lower temperature (e.g., about 110° C. to about 130° C.), can result in a composite structure exhibiting high strength and enhanced microbial barrier protection characteristics. High bond temperatures are about 140° to 160° C. and low bond temperatures are about 90° to 130° C., for example. In some embodiments, the high bond temperature is at least about 140° C., or at least about 150° C. In some embodiments, the low bond temperature is less than about 140° C., or less than about 130° C. It was further discovered that such a process can allow for the use of a polyethylene (or other polyolefin) meltblown layer in certain embodiments.

In various methods of forming a composite structure as described herein, the method can include first forming a spunbond nonwoven layer followed by thermally bonding the spunbond layer such that the exterior surface (e.g., the sheath component of the bicomponent fibers of the spunbond nonwoven) is substantially melted. Methods of the present invention can further include laying down a meltblown layer on top of the thermally bonded spunbond layer. This spunbond/meltblown structure can then be thermally bonded at a lower temperature, wherein the lower temperature does not entirely melt the meltblown layer or the exterior surface of the spunbond layer. Optionally, a second spunbond layer can be added on top of the meltblown layer before or after thermally bonding the first spunbond layer and the meltblown layer. If a second spunbond layer is added after thermally bonding the first spunbond layer and the meltblown layer, the spunbond-meltblown-spunbond composite structure can be thermally bonded at the lower bond temperature.

Various embodiments of the composite structures described herein and made according to methods described herein can be useful as a packaging material. A packaging material's ability to resist passage of microorganisms can be expressed as the LRV (log reduction value), which is calculated by the following equation:

$$LRV = \log_{10} N_0 - \log_{10} N_1$$

Where:
$N_0$=Average bacterial challenge determined from the challenge control filter, measured in CFU.
$N_1$=Average number of bacteria passing through the test article, measured in CFU.

The relationship between LRV and the percentage of spores retained by the test material is as follows:

| LRV | Spores Retained (%) |
|---|---|
| 1.0 | 90 |
| 2.0 | 99 |
| 3.0 | 99.9 |
| 4.0 | 99.99 |
| 5.0 | 99.999 |

In various embodiments, composite structures formed according to methods described herein can have a LRV of about 2.0 or higher, or about 2.5 or higher, or about 3.0 or higher, where LRV is determined according to ASTM F1608.

EXAMPLES

A number of examples are described below to demonstrate the strength and microbial barrier protection characteristics of composite structures of the present invention.

Example 1

Several spunbond-meltblown (SM) and spunbond-meltblown-spunbond (SMS) composite structures are prepared according to the processes described above. The spunbond layers comprised bicomponent fibers having a PET internal component and a PE external component. The meltblown layers comprised PE.

For samples 1-4, the spunbond layers were calendared at a high temperature of about 140° C. before laying a meltblown layer (MB) between the two spunbond layers (SB) to form an SMS three-layer structure (i.e., spunbond-meltblown-spunbond). The SMS structure was then laminated by calendaring at a low bonding temperature of about 110° C. to about 135° C. to form the final composite structures.

Table 1 below lists the ratio in mass of PET to PE in the spunbond layer(s), the basis weight of the meltblown (MB) and spunbond (SB) layers, as well as the basis weight of the final composite structure, measured in grams per square meter (GSM). Table 1 further identifies lamination temperature, speed, air permeability, and hydrohead. The lamination temperature is the calendar temperature for bonding the final composite structure (i.e., the low bonding temperature). Table 2 below exhibits tensile strength of the composite structure in a main direction (MD) and a cross direction (CD) (each measured in pounds per foot), ball burst (measured in pounds per foot), and tear strength in a main direction (MD) and a cross direction (CD) (each measured in grams per foot) of the final composite structure, as well as Log Reduction Value (LRV) measurements for the composite structure.

It is noted that for all samples, basis weights are calculated according to ASTM D3776; air permeability is calculated according to ASTM D737; tensile strength is calculated according to ASTM D5035, hydrohead is calculated according to AATCC 127; ball burst is calculated according to ASTM D6797; and tear strength is calculated according to ASTM D1424.

The LRV test for each of the samples quantifies the microbial barrier properties of the material. For the purposes of these experiments, LRV was determined according to ASTM F1608 guidelines. This includes a challenge control of $1 \times 10^6$ CFU±0.5 log and the negative control must not have counts in excess of the limit of detection for the test article. The LRV testing procedure is outlined below.

First the microbial challenge was prepared. A pure culture of *Bacillus atrophaeus* (ATCC #9372) was spread across tryptic soy agar (TSA) and incubated. The growth was harvested in sterile water and filtered through several layers of sterile gauze to remove large debris. The suspension was heat shocked at 80-85° C. for 10 minutes to destroy all the vegetative cells. The final suspension was diluted to achieve a target challenge of $1 \times 10^6$ CFU±0.5 log ($3.2 \times 10^5$-$3.2 \times 10^6$) CFU/mL. The suspension was stored at 2-8° C. until needed.

The exposure chamber, as detailed in ASTM F1608, was constructed mainly from acrylic sheeting and consisted of two major sections. The bottom section contained a six-place manifold connected to six flowmeters, one per port and capable of 2.8 L/min. Each flowmeter is attached to one filtering funnel. The outlet to the manifold was attached to a vacuum source. A vacuum gauge was mounted in-line of the manifold and the vacuum source. The upper chamber contained a fan for dispersion of the bacterial aerosol, a port for attachment of the nebulizer, a port for exhausting the chamber, and a plate for attachment of the six filter units. The exhaust port was attached to a filtered vacuum source.

The nebulizer port was attached to a "T" connector which attached to a glass nebulizer. The vertical leg of the "T" connector led to a trap jar which was used to retain unsuspended droplets produced by the nebulizer. The nebulizer was attached to a filtered air source. A flowmeter capable of 8.5 L/min was mounted in-line of the nebulizer and air source.

Testing was conducted in a bio-containment hood. A sterile 0.45 μm membrane filter was aseptically placed on the base of each filter unit. For each port that a test article was tested in, a precut 47 mm disk of the test material was placed on top of the filter membrane. At least one port of the exposure chamber was reserved for the test control. The test units were attached to the bottom of the exposure chamber. Each port flowmeter was adjusted to 2.8 L/min. The vacuum pressure in the test line was 12 in Hg.

The filtered air for the nebulizer was set to a flow rate of 8.5 L/min. The spore challenge was dispersed by a fan into the exposure chamber for 15 minutes. At the end of the challenge period, the air, vacuum, and fan were turned off. The chamber was then connected directly to a filtered vacuum source through the exhaust port and evacuated for 15 minutes. The filtering units were removed from the exposure chamber and using sterile forceps, each filter membrane was aseptically removed. A new, sterile pair of forceps was used for each membrane.

Spores were eluted from the membrane by vortexing for one minute the glass bead tube containing 10 mL of sterile water. Serial dilutions were performed and the spore concentration determined by standard plate count technique. Plates were incubated for 24-48 hours at 30-35° C. This method is a modified enumeration method that has been validated for use by Nelson Laboratories LLC (NL).

At least one challenge control and a negative control were included in each test run. The challenge control consisted of a 0.45 μm membrane filter placed in a filter housing and tested in the same manner as the test articles. The challenge control determined the challenge titer during testing. The negative control consisted of a 0.45 μm membrane filter placed underneath the challenge control membrane. The negative control counts were determined by being placed directly on a TSA plate.

Table 1 below lists the ratio in mass of PET to PE in the spunbond layer(s), the basis weight of the meltblown (MB) and spunbond (SB) layers, as well as the basis weight of the final composite structure, measured in grams per square meter (GSM). Table 1 further identifies lamination temperature, speed, air permeability, and hydrohead. The lamination temperature is the calendar temperature for bonding the final composite structure (i.e., the low bonding temperature). Table 2 below exhibits tensile strength of the composite structure in a main direction (MD) and a cross direction (CD) (each measured in pounds per foot), ball burst (measured in pounds per foot), and tear strength in a main direction (MD) and a cross direction (CD) (each measured in grams per foot) of the final composite structure, as well as Log Reduction Value (LRV) measurements for the composite structure.

TABLE 1

SMS Composite Structures Wherein the Spunbond Layers are Prebonded

| Sample | Ratio | SB Basis Weight (g/m²) | MB Basis Weight (g/m²) | Lamination Temperature (C.) | Speed (ft/min) | Basis Weight (g/m²) (composite) | Air Permeability (Gurley Seconds) | Hydrohead (mbar) |
|---|---|---|---|---|---|---|---|---|
| 1 | 70/30 | 75 | 30 | 127 | 20 | 172.6 | 350.22 | 111.2 |
| 2 | 70/30 | 75 | 50 (0.5 ghm*) | 124 | 15 | 185.6 | 264.21 | 109.2 |
| 3 | 70/30 | 75 | 50 (0.5 ghm*) | 124 | 20 | 188 | 33.58 | 109.4 |
| 4 | 70/30 | 75 | 50 (0.5 ghm*) | 123 | 20 | 199.2 | 106.87 | 125 |

*mass flow rate in grams per hole per minute (ghm)

TABLE 2

SMS Composite Structures Wherein the Spunbond Layers are Prebonded

| Sample | Tensile - MD Peak Load (lbf) | Tensile - CD Peak Load (lbf) | Ball Burst Peak Load (lbf) | Tear - MD (gf) | Tear - CD (gf) | LRV |
|---|---|---|---|---|---|---|
| 1 | 74.04 | 35.41 | 130.65 | 4249.6 | 5648 | 1.2, 1.6, 1.4, 1.3 Average = 1.4 |
| 2 | 81.64 | 32.25 | 120.73 | 3174.4 | >6400 | |
| 3 | 80.37 | 31.65 | 124.93 | >6400 | >6400 | 2.0, 2.2, 2.3, 2.4 Average = 2.2 |
| 4 | 81.55 | 35.35 | 136.33 | 4646.4 | >6400 | 3.7, 3.8, 2.1, 2.4 Average = 3.0 |

For samples 5-9, the spunbond layers were not calendared at a high temperature of about 140° C. before laying a meltblown layer (MB) between the two spunbond layers (SB). The spunbond-meltblown-spunbond structure was only calendared at a low bonding temperature of about 120° C. to about 125° C. to form the final composite structures, which is a conventional process for forming standard medical fabric SMS.

Table 3 below lists the ratio in mass of PET to PE in the spunbond layer(s), the basis weight of the meltblown (MB) and spunbond (SB) layers, as well as the basis weight of the final composite structure, measured in grams per square meter (GSM). Table 3 further identifies lamination temperature, speed, air permeability, and hydrohead. Table 4 below exhibits tensile strength of the composite structure in a main direction (MD) and a cross direction (CD) (each measured in pounds per foot), ball burst (measured in pounds per foot), and tear strength in a main direction (MD) and a cross direction (CD) (each measured in grams per foot) of the final composite structure.

TABLE 3

SMS Composite Structures Wherein the Spunbond Layers are Not Prebonded

| Sample | Ratio | SB Basis Weight (g/m²) | MB Basis Weight (g/m²) | Lamination Temperature (C.) | Speed (ft/min) | Basis Weight (g/m²) (composite) | Air Permeability (Gurley Seconds) | Hydrohead (mbar) |
|---|---|---|---|---|---|---|---|---|
| 5 | 80/20 | 70 | 50 (0.5 ghm) | 123 | 10 | 195.8 | 1.59 | 50.5 |
| 6 | 80/20 | 70 | 30 | 123 | 10 | 176.8 | 1.46 | 43.5 |
| 7 | 80/20 | 70 | 50 (0.5 ghm) | 123 | 10 | 195.4 | 1.54 | 46.4 |
| 8 | 70/30 | 70 | 30 | 123 | 10 | 178.4 | 1.63 | 49.2 |
| 9 | 70/30 | 70 | 50 (0.5 ghm) | 123 | 10 | 203 | 1.37 | 54.6 |

TABLE 4

SMS Composite Structures Wherein the Spunbond Layers are Not Prebonded

| Sample | Tensile - MD Peak Load (lbf) | Tensile - CD Peak Load (lbf) | Ball Burst Peak Load (lbf) | Tear - MD (gf) | Tear - CD (gf) |
|---|---|---|---|---|---|
| 5 | 42.96 | 17.62 | 95.24 | >6400 | >6400 |
| 6 | 41.82 | 17.85 | 256.97 | >6400 | >6400 |
| 7 | 46.44 | 18.05 | 87.96 | >6400 | >6400 |
| 8 | 53.24 | 26.15 | 120.00 | >6400 | >6400 |
| 9 | 53.31 | 25.74 | 116.00 | >6400 | >6400 |

For samples 10-18, a composite structure comprising a single spunbond layer and a single meltblown layer (i.e., SM composite structure) is prepared. The spunbond layer was calendared at a high temperature of about 140° C. before laying a meltblown layer (MB) onto the spunbond layer (SB). The spunbond-meltblown structure was then calendared at a low bonding temperature of about 130° C. to form the final composite structures.

Table 5 below lists the ratio in mass of PET to PE in the spunbond layer(s), the basis weight of the meltblown (MB) and spunbond (SB) layers, as well as the basis weight of the final composite structure, measured in grams per square meter (GSM). Table 5 further identifies lamination temperature, speed, air permeability, and hydrohead. Table 6 below exhibits tensile strength of the composite structure in a main direction (MD) and a cross direction (CD) (each measured in pounds per foot), ball burst (measured in pounds per foot), and tear strength in a main direction (MD) and a cross direction (CD) (each measured in grams per foot) of the final composite structure, as well as layer bacterial penetration (LRV) measurements for the composite structure.

For samples 19-23, a composite structure comprising a single spunbond layer and a single meltblown layer is prepared. The spunbond layer was not calendared first at a high temperature of about 140° C. before laying a meltblown layer (MB) onto the spunbond layer (SB). The spunbond-meltblown structure was only calendared at a low bonding temperature of about 130° C. to about 135° C. to form the final composite structures.

Table 7 below lists the basis weight of the meltblown (MB) and spunbond (SB) layers, as well as the basis weight of the final composite structure, measured in grams per square meter (GSM). Table 7 further identifies lamination temperature, speed, air permeability, and hydrohead. Table 8 below exhibits tensile strength of the composite structure in a main direction (MD) and a cross direction (CD) (each measured in pounds per foot), ball burst (measured in pounds per foot), and tear strength in a main direction (MD) and a cross direction (CD) (each measured in grams per foot) of the final composite structure.

TABLE 5

SM Composite Structures Wherein the Spunbond Layers are Prebonded

| Sample | Ratio | SB Basis Weight (g/m²) | MB Basis Weight (g/m²) | Lamination Temperature (C.) | Speed (ft/min) | Basis Weight (g/m²) (composite) | Air Permeability (Gurley Seconds) | Hydrohead (mbar) |
|---|---|---|---|---|---|---|---|---|
| 10 | 70/30 | 120 | 30 | 130 | 15 | 146.2 | 17099.20 | 131.5 |
| 11 | 70/30 | 120 | 30 | 130 | 20 | 147.6 | 608.53 | 93.4 |
| 12 | 70/30 | 120 | 30 | 130 | 25 | 149.6 | 91.87 | 89.8 |
| 13 | 80/20 | 120 | 30 | 130 | 20 | 152.6 | 279.14 | 93.2 |
| 14 | 80/20 | 120 | 30 | 130 | 25 | 148 | 51.41 | 91.4 |
| 15 | 70/30 | 120 | 50 (0.3 ghm) | 130 | 10 | 168.4 | 2494.00 | 117.1 |
| 16 | 70/30 | 120 | 50 (0.3 ghm) | 130 | 15 | 170.8 | 26.15 | 87.9 |
| 17 | 80/20 | 120 | 50 (0.3 ghm) | 130 | 15 | 171.8 | 40.02 | 92.2 |
| 18 | 80/20 | 120 | 50 (0.3 ghm) | 130 | 20 | 171.6 | 20.77 | 87.6 |

TABLE 6

SM Composite Structures Wherein the Spunbond Layers are Prebonded

| Sample | Tensile - MD Peak Load (lbf) | Tensile - CD Peak Load (lbf) | Ball Burst Peak Load (lbf) | Tear - MD (gf) | Tear - CD (gf) | LRV |
|---|---|---|---|---|---|---|
| 10 | 63.50 | 29.12 | 120.41 | 1689.6 | 3622.4 | |
| 11 | 59.33 | 28.44 | 101.91 | 3507.2 | 4851.2 | |
| 12 | 59.46 | 24.98 | 109.39 | 3737.6 | 5696 | |
| 13 | 58.09 | 24.16 | 103.03 | 4467.2 | >6400 | |
| 14 | 50.73 | 20.83 | 86.24 | 5593.6 | >6400 | |
| 15 | 60.41 | 28.34 | 102.18 | 3289.6 | 3289.6 | |
| 16 | 61.14 | 26.86 | 89.77 | 5478.4 | >6400 | 2.1, 2.2, 2.3, 2.2 Average = 2.2 |
| 17 | 50.67 | 21.05 | 82.56 | 5990 | >6400 | |
| 18 | 44.31 | 18.90 | 82.86 | >6400 | >6400 | |

TABLE 7

SM Composite Structures Wherein the Spunbond Layers are Not Prebonded

| Sample | Ratio | SB Basis Weight (g/m²) | MB Basis Weight (g/m²) | Lamination Temperature (C.) | Speed (ft/min) | Basis Weight (g/m²) (composite) | Air Permeability (Gurley Seconds) | Hydrohead (mbar) |
|---|---|---|---|---|---|---|---|---|
| 19 | 70/30 | 120 | 50 (0.3 ghm) | 130 | 15 | 165.4 | 362.40 | 93.9 |
| 20 | 70/30 | 120 | 50 (0.3 ghm) | 130 | 10 | 171.2 | 462.79 | 116.4 |
| 21 | 70/30 | 120 | 50 (0.3 ghm) | 130 | 7 | 172.4 | 353.18 | 89.4 |
| 22 | 70/30 | 120 | 30 | 135 | 10 | 147 | 466.13 | 83.4 |
| 23 | 70/30 | 120 | 30 | 135 | 7 | 150.6 | 383.45 | 77.8 |

TABLE 8

SM Composite Structures Wherein the Spunbond Layers are Not Prebonded

| Sample | Tensile - MD Peak Load (lbf) | Tensile - CD Peak Load (lbf) | Ball Burst Peak Load (lbf) | Tear - MD (gf) | Tear - CD (gf) |
|---|---|---|---|---|---|
| 19 | 42.63 | 20.18 | 80.69 | 3571.2 | 6169.6 |
| 20 | 43.19 | 23.62 | 83.02 | 4313.6 | 5593.6 |
| 21 | 47.73 | 27.45 | 94.38 | 3456 | >6400 |
| 22 | 58.46 | 29.80 | 109.57 | 1651.2 | 4441.6 |
| 23 | 57.06 | 31.38 | 98.70 | 1408 | 4057.6 |

As illustrated in the tables above, prebonding the spunbond layer of the composite structure prior to thermally bonding the meltblown and spunbond layers at a lower bond temperature results in a final composite structure having enhanced tensile strength and tear strength. It is noted that the tear tests on the SMS structures overloaded the machine and exceeded the max.

It is further noted that the LRV values of the composite structures of the present invention are very favorable (at least 1.4 and as high as about 3). The LRV of the composite structures of the present invention are comparable, if not better, than SMS fabrics on the market and exhibit increased mechanical performance. TYVEK 2F S has an LRV of 3.2, tensile strength (MD & CD) of 35 lbf, and Elmendorf tear is 0.7 lbf for 60 gsm, for example.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of making a composite structure comprising:
   receiving a substantially planar nonwoven spunbond layer comprising a plurality of multicomponent fibers;
   thermally bonding the nonwoven spunbond layer at a first bond temperature;
   laying down a meltblown layer on top of the thermally bonded nonwoven spunbond layer to form an intermediate structure;
   thermally bonding the intermediate structure at a second bond temperature to form a final composite structure, wherein the first bond temperature is higher than the second bond temperature.

2. The method of claim 1, further comprising:
   receiving a second substantially planar nonwoven spunbond layer comprising a plurality of multicomponent fibers;
   thermally bonding the second nonwoven spunbond layer at the first bond temperature;
   laying down the second nonwoven spunbond layer on top of the meltblown layer prior to thermally bonding the intermediate structure.

3. The method of claim 1, wherein the multicomponent fibers are bicomponent fibers comprising an external fiber component and an internal fiber component; wherein said external fiber component enwraps said internal fiber component; said external fiber component having a lower melting temperature than said internal fiber component.

4. The method of claim 3, wherein the external fiber component is polyethylene or polypropylene.

5. The method of claim 3, wherein the internal fiber component comprises a polymer selected from the group consisting of polyesters and polyamides.

6. The method of claim 3, wherein the internal fiber component comprises a polymer selected from the group consisting of polybutylene terephthalate (PBT), polyethylene terephthalate (PET), polylactic acid (PLA), nylon 6, nylon 6/6, nylon 11, nylon 12, nylon 6/11, thermoplastic polyurethanes (TPUs) and thermoplastic elastomers (TPEs).

7. The method of claim 1, wherein the first bond temperature is about 140° C. to about 160° C.

8. The method of claim 1, wherein the second bond temperature is about 90° C. to about 130° C.

9. The method of claim 1, wherein the composite structure has an LRV value of about 2.0 or higher.

10. The method of claim 1, wherein the meltblown layer comprises a plurality of fibers comprising polyethylene or polypropylene.

* * * * *